(12) United States Patent
Nagarekawa et al.

(10) Patent No.: US 8,157,386 B2
(45) Date of Patent: *Apr. 17, 2012

(54) PROJECTOR

(75) Inventors: Satoru Nagarekawa, Matsumoto (JP);
Eiji Morikuni, Shiojiri (JP); Nobutaka Minefuji, Azumino (JP); Masayuki Okoshi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.
This patent is subject to a terminal disclaimer.

(21) Appl. No.: 13/227,937

(22) Filed: Sep. 8, 2011

(65) Prior Publication Data
US 2011/0317135 A1    Dec. 29, 2011

Related U.S. Application Data

(63) Continuation of application No. 12/273,196, filed on Nov. 18, 2008.

(30) Foreign Application Priority Data

Mar. 11, 2008  (JP) ................................. 2008-060685

(51) Int. Cl.
*G03B 21/22* (2006.01)
*G03B 21/28* (2006.01)
*G02B 5/08* (2006.01)

(52) U.S. Cl. .............................. 353/78; 353/99; 359/857

(58) Field of Classification Search .................... 353/98, 353/99, 102, 81, 78, 74, 77; 348/756; 359/850, 359/857
See application file for complete search history.

(56) References Cited

U.S. PATENT DOCUMENTS

| 6,631,994 | B2 | 10/2003 | Suzuki et al. |
| 6,824,274 | B2 | 11/2004 | Suzuki et al. |
| 6,994,437 | B2 | 2/2006 | Suzuki et al. |
| 7,009,765 | B2 | 3/2006 | Gohman |
| 7,090,354 | B2 | 8/2006 | Engle et al. |
| 7,150,537 | B2 | 12/2006 | Peterson et al. |
| 7,175,287 | B2 | 2/2007 | Gohman |
| 7,230,774 | B2 | 6/2007 | Suzuki et al. |
| 7,545,586 | B2 | 6/2009 | Gohman |
| 7,572,014 | B2 | 8/2009 | Suzuki et al. |
| 7,857,463 | B2 | 12/2010 | Destain |
| 2006/0227299 | A1 | 10/2006 | Hisada et al. |
| 2007/0146652 | A1 | 6/2007 | Peterson et al. |
| 2009/0244701 | A1 | 10/2009 | Gohman |

FOREIGN PATENT DOCUMENTS

| CN | 1380989 A | 11/2002 |
| CN | 1692297 A | 11/2005 |
| JP | A 2006-235516 | 9/2006 |
| JP | A 2008-096983 | 4/2008 |
| JP | A 2008-096984 | 4/2008 |
| WO | WO 2006/004366 A1 | 1/2006 |

OTHER PUBLICATIONS

Office Action issued in U.S. Appl. No. 12/273,196; mailed Feb. 4, 2011.
Office Action issued in U.S. Appl. No. 12/273,196; mailed Jun. 23, 2011.

*Primary Examiner* — William C Dowling
*Assistant Examiner* — Ryan Howard
(74) *Attorney, Agent, or Firm* — Oliff & Berridge, PLC

(57) ABSTRACT

In a projection optical system comprising: two lens groups, and a curved plane mirror, wherein the projection optical system including two story structure, and having bend means for bending at least two times the light incident from an electro-optic modulator.

2 Claims, 14 Drawing Sheets

PROJECTOR

CROSS-REFERENCE TO RELATED APPLICATIONS

This is a Continuation of application Ser. No. 12/273,196 filed Nov. 18, 2008, which claims priority of Japanese Patent Application No. 2008-060685, filed Mar. 11, 2008. The disclosure of these prior applications is hereby incorporated by reference herein in its entirety.

BACKGROUND

1. Technical Field

The present invention relates to a projector.

2. Related Art

As a close-range (short-distance) projection type projector, a projector including a projection system having two lens groups and one curved mirror has been known (see JP-A-2006-235516, for example).

Since the number of curved mirror is one in the projector of the related art, assembling accuracy can be higher and manufacturing cost can be lower than those for a projector including a plurality of curved mirrors.

On the other hand, in recent years, there has been a demand to make a projector more compact.

SUMMARY

An advantage of some aspects of the invention is to provide a projector more compact than those of related art.

A projector of an aspect of the invention includes an illumination system that emits an illumination light flux, an electro-optic modulator that modulates the light from the illumination system in accordance with image information, and a projection system that projects the light modulated by the electro-optic modulator. The projection system includes a first lens group including a plurality of lenses, the lens optical axis of the plurality of lenses shifted from the central axis of an image formation area of the electro-optic modulator in a first direction; a second lens group including a plurality of lenses, the second lens group disposed on the light-exiting side of the first lens group; a curved mirror disposed on the light-exiting side of the second lens group; and a reflective light guiding system disposed along the optical path between the first lens group and the curved mirror, the reflective light guiding system reflecting the light from the first lens group in a predetermined direction containing a second direction that is opposite the first direction as a vector component and guiding the light to the curved mirror. The reflective light guiding system includes at least two reflection elements, and each of the at least two reflection elements has a flat reflection plane.

According to the projector of the aspect of the invention, since the reflective light guiding system including at least two reflection elements is disposed along the optical path between the first lens group and the curved mirror, the light from the first lens group can be bent at least twice and guided to the curved mirror. As a result, the space in which the projection system is disposed can be reduced (more compact) as compared to a case, for example, in the configuration of a projector of related art, where the light from the first lens group is not bent at all but directly guided to the curved mirror, whereby the projector can be more compact.

The space in which the projection system is disposed can also be reduced (more compact) as compared to the space required in related art, as will be described later in detail in a comparative example, by disposing a reflective light guiding system along the optical path between the first lens group and the curved mirror, the reflective light guiding system reflecting the light from the first lens group in a third direction different from the first and second directions (for example, when the first direction is oriented downward and the second direction is oriented upward, the third direction is oriented sideward with respect to the direction in which the light travels) and guiding the reflected light to the curved mirror. In this case, however, since the curved mirror is disposed in a position shifted in the first direction from the electro-optic modulator (first lens group), part of the light reflected off the curved mirror may disadvantageously hit an optical system (including from illumination system to projection system) and other components. To prevent the light reflected off the curved mirror from hitting the optical system, for example, the location where the optical system and other components are disposed must be changed, which is not preferable because the degrees of freedom in product design are reduced.

In contrast, since the projector according to the aspect of the invention includes the reflective light guiding system that reflects the light from the first lens group in a predetermined direction containing the second direction as a vector component and guides the reflected light to the curved mirror, the curved mirror is disposed in a position shifted from the electro-optic modulator (first lens group) in the second direction. The light reflected off the curved mirror will not therefore hit the optical system, and it is possible to achieve a projector in which a large number of degrees of freedom are available in product design.

In the projector according to the aspect of the invention, since the plurality of reflection elements that form the reflective light guiding system have flat reflection planes, the structure of the reflective light guiding system is simpler and the reflection elements can be smaller than in a case where the reflection planes are curved. Such an advantage contributes to reduction in size of the product.

In the projector according to the aspect of the invention, it is preferable that the optical axis of the first lens group does not intersect the optical axis of the curved mirror.

A projector configured in such a way that the optical axis of the first lens group intersects the optical axis of the curved mirror is, for example, a projector including a reflective light guiding system that reflects the light from the first lens group in the third direction and guides the reflected light to the curved mirror as described above. In this case, however, as described above, the degrees of freedom in product design are disadvantageously reduced.

In contrast, since the projector according to the aspect of the invention is configured in such a way that the optical axis of the first lens group does not intersect the optical axis of the curved mirror, it is possible to achieve a projector in which a large number of degrees of freedom are available in product design.

In the projector according to the aspect of the invention, it is preferable that two of the optical axis of the first lens group, the optical axis of the second lens group, and the optical axis of the curved mirror are present in the same plane, and the one remaining optical axis is not present in the plane.

Such a configuration allows the space in the projector to be effectively used and the projector to be more compact, readily prevents the light reflected off the curved mirror from hitting the optical system, and allows a projector in which a large number of degrees of freedom are available in product design to be achieved.

In the projector according to the aspect of the invention, it is preferable that the reflective light guiding system is configured as a unit structure in which the at least two reflection elements are integrated.

Such a configuration allows the apparatus to be readily assembled.

In the projector according to the aspect of the invention, it is preferable that each of the first lens group and the second lens group is configured as a unit structure in which the plurality of lenses are integrated.

Such a configuration allows the apparatus to be readily assembled.

In the projector according to the aspect of the invention, it is preferable that the reflective light guiding system includes a first reflection element disposed between the first lens group and the second lens group, the first reflection element reflecting the light from the first lens group in the second direction, and a second reflection element disposed between the first reflection element and the second lens group or between the second lens group and the curved mirror.

Such a configuration allows a projector that is more compact and has a larger number of degrees of freedom in product design than related art to be readily achieved.

In the projector according to the aspect of the invention, it is preferable that the reflective light guiding system includes a first reflection element disposed between the first lens group and the second lens group, the first reflection element reflecting the light from the first lens group in the second direction; a second reflection element disposed between the first reflection element and the second lens group in such a way that a normal to the reflection plane of the second reflection element is perpendicular to a normal to the reflection plane of the first reflection element; and a third reflection element disposed between the second reflection element and the second lens group, the third reflection element reflecting the light from the second reflection element toward the second lens group.

Such a configuration allows a projector that is more compact and has a larger number of degrees of freedom in product design than related art to be readily achieved.

In the projector according to the aspect of the invention, it is preferable that each of the reflection elements in the reflective light guiding system is a reflection mirror or a reflection prism.

Such a configuration allows the light from the first lens group to be reliably guided to the curved mirror. Further, when the reflection elements are reflection mirrors, the manufacturing cost of the projector can be reduced as compared to a case where the reflection elements are reflection prisms.

In the projector according to the aspect of the invention, it is preferable that the curved mirror is a concave mirror.

Although the curved mirror can be, for example, a convex mirror, the above configuration allows the product height of the projector to be lower than in a case where the curved mirror is a convex mirror.

Further, (1) In a projection optical system comprising:
a plurality of lens groups, and
a curved plane mirror,
wherein the projection optical system including two story structure, and having a plurality of plane mirrors that bends at least two times the light incident from a color combining system disposed upstream of the light path.

(2) The projection optical system comprising:
first lens group, first plane mirror, second lens group, second plane mirror, and curved mirror from upstream to downstream of the light path in the order.

(3) The projection optical system comprising:
first lens group, firs plane mirror, second plane mirror, second lens group, and curved mirror from upstream to downstream of the light path in the order.

(4) The projection optical system comprising:
first lens group, first plane mirror, second lens group, second plane mirror, third lens group, and curved mirror from upstream to downstream of the light path in the order.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Figure 1:
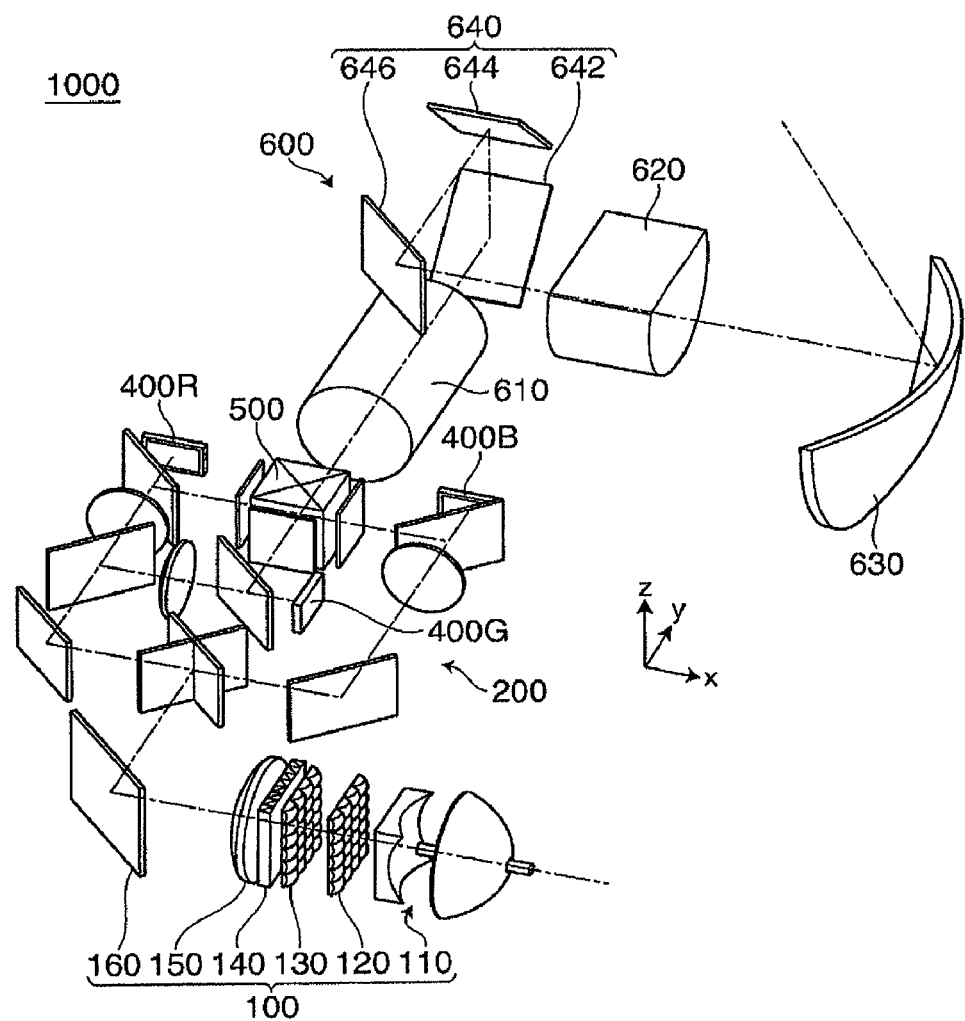
FIG. 1 is an overall perspective view showing the optical system of a projector 1000 according to a first embodiment.

Projectors according to some aspects of the invention will be described with reference to embodiments shown in the drawings.

First Embodiment

In a first embodiment, a case where a reflective light guiding system includes three reflection elements is described. In the following description, a "first direction" is oriented downward, and a "second direction" is oriented upward.

First, the configuration of a projector according to the first embodiment will be described with reference to FIGS. 1 to 3.

FIG. 1 is an overall perspective view showing the optical system of a projector 1000 according to the first embodiment. FIG. 2 is a top view showing part of the optical system from an illumination system 100 to a cross dichroic prism 500. FIGS. 3A and 3B explain a projection system 600. FIG. 3A is a top view showing the projection system 600 (viewed from the z (+) direction), and FIG. 3B is a side view showing the projection system 600 (viewed from the x (−) direction).

In FIG. 1, a plurality of lenses that form a first lens group 610 and a second lens group 620 are abstractly illustrated.

In the following description, three directions perpendicular to one another are called a y direction (the direction along the central axis of light that exits from the cross dichroic prism 500), an x direction (the horizontal direction perpendicular to the y direction), and a z direction (the vertical direction perpendicular to the y direction). The downward direction (first direction) represents the "z (−) direction," and the upward direction (second direction) represents the "z (+) direction."

The projector 1000 according to the first embodiment includes, as shown in FIG. 1, an illumination system 100 from which an illumination light flux is outputted, a color separation/light guiding system 200 that separates the illumination light flux from the illumination system 100 into red, green, and blue three color light beams and guides the separated color light beams to areas to be illuminated, three reflective type of liquid crystal panels 400R, 400G, and 400B as electro-optic modulators that modulate the three color light beams separated by the color separation/light guiding system 200 in accordance with image information, a cross dichroic prism 500 as a color combining system that combines the color light beams modulated by the three reflective type of liquid crystal panels 400R, 400G, and 400B, and a projection system 600 that projects the light combined by the cross dichroic prism 500 on a screen SCR or other projection planes.

Figure 2:
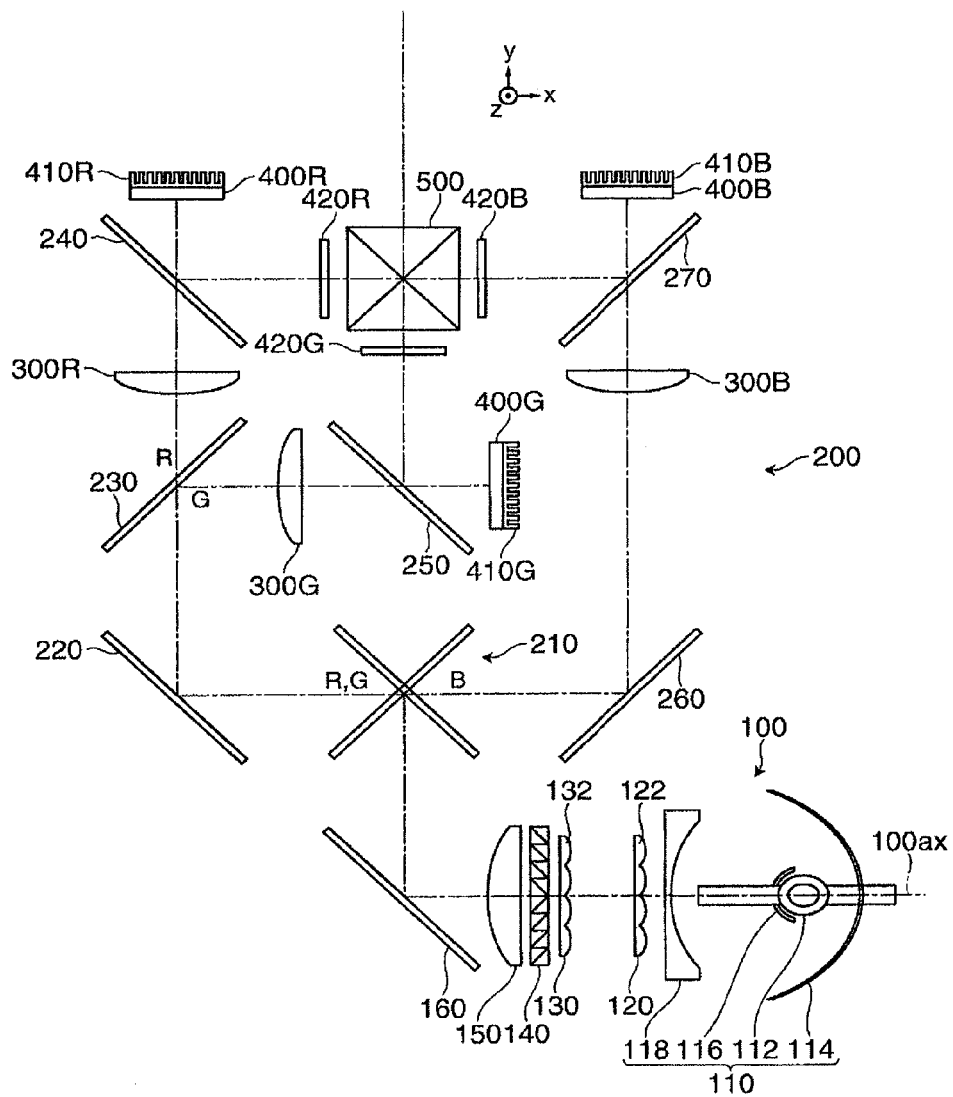
FIG. 2 is a top view showing part of the optical system from an illumination optical system 100 to a cross dichroic prism 500.
Figure 3A:
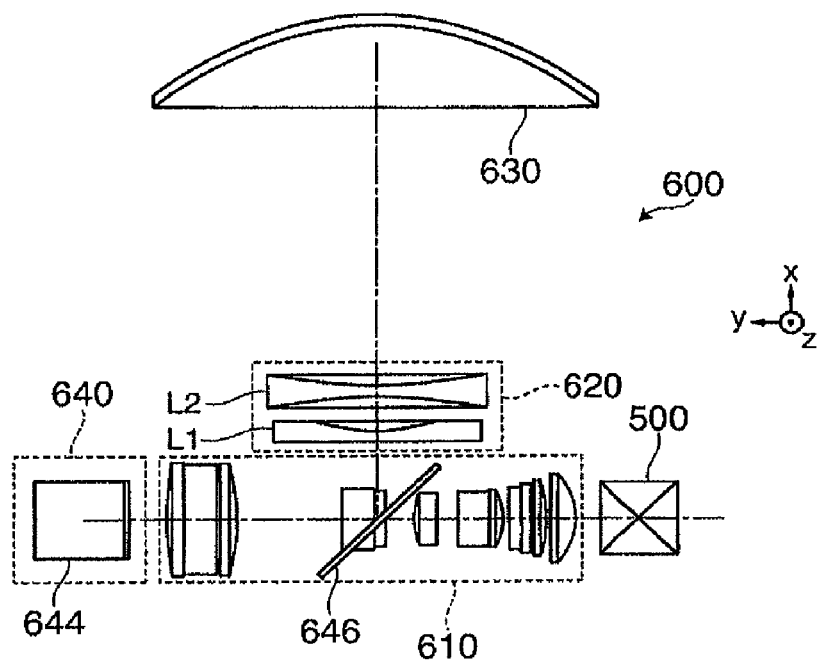
FIGS. 3A and 3B explain a projection system 600.
Figure 3B:
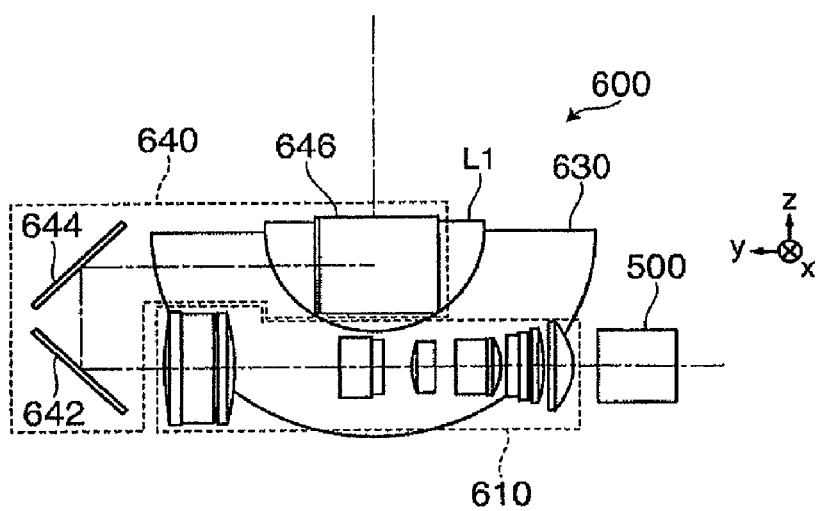

The illumination system 100 includes, as shown in FIGS. 1 and 2, a light source 110 that emits illumination light flux toward the areas to be illuminated, a first lens array 120 having a plurality of first lenslets 122 that divide the illumination light flux emitted from the light source 110 into a plurality of sub-light fluxes, a second lens array 130 having a plurality of second lenslets 132 that correspond to the plurality of first lenslets 122 in the first lens array 120, a polarization conversion element 140 that converts the sub-light fluxes from the second lens array 130 into substantially one type of linearly polarized sub-light fluxes having an aligned polarization direction and outputs the linearly polarized sub-light fluxes, a superimposing lens 150 that superimposes the sub-light fluxes outputted from the polarization conversion element 140 on the areas to be illuminated, and a reflection mirror 160 that reflects the light from the superimposing lens 150 toward a color separation system 210 in the color separation/light guiding system 200.

The light source 110 includes an ellipsoidal reflector 114, an arc tube 112, the emission center of which is located in the vicinity of a first focal point of the ellipsoidal reflector 114, a sub-mirror 116 that reflects the light emitted from the arc tube 112 toward the areas to be illuminated back toward the arc tube 112, and a concave lens 118 that outputs the converging light from the ellipsoidal reflector 114 as substantially parallel light. The light source 110 emits a light flux having an illumination optical axis 100ax as the central axis.

The arc tube 112 includes a lamp body and a pair of sealed portions extending from both sides of the lamp body. The lamp body is made of quartz glass and has a spherical shape. The lamp body has a pair of electrodes disposed in the lamp body and mercury, a rare gas, and a trace of halogen encapsulated in the lamp body. Various arc tubes can be employed as the arc tube 112, such as a metal-halide lamp, a high-pressure mercury lamp, and an ultrahigh-pressure mercury lamp.

The ellipsoidal reflector 114 includes a tubular neck-shaped portion into which one of the sealed portions of the art tube 112 is inserted and bonded, and a reflective concave plane that reflects the light emitted from the art tube 112 toward a second focus position.

The sub-mirror 116 is a reflection element disposed in such a way that it covers approximately half of the lamp body of the arc tube 112 and faces the concave reflection plane of the ellipsoidal reflector 114. The other sealed portion of the arc tube 112 is inserted and bonded to the sub-mirror 116. The sub-mirror 116 returns the portion of the light emitted from the arc tube 112 that is not directed toward the ellipsoidal reflector 114 back to the arc tube 112 and onto the ellipsoidal reflector 114.

The concave lens 118 is disposed on the illuminated area side of the ellipsoidal reflector 114 and configured to output the light from the ellipsoidal reflector 114 toward the first lens array 120.

The first lens array 120 serves as a light flux dividing optical element that divides the light from the concave lens 118 into a plurality of sub-light fluxes, and includes a plurality of first lenslets 122 arranged in a matrix formed of multiple rows and multiple columns in a plane perpendicular to the illumination optical axis 100ax. Although not illustrated, the outer shape of each of the first lenslets 122 is similar to the outer shape of an image formation area of each of the liquid crystal panels 400R, 400G, and 400B.

The second lens array 130 in conjunction with the superimposing lens 150 has a function of focusing the images of the first lenslets 122 in the first lens array 120 in the vicinity of the image formation area of each of the reflective type of liquid crystal panels 400R, 400G, and 400B. The second lens array 130 has substantially the same configuration as that of the first lens array 120 and includes a plurality of second lenslets 132 arranged in a matrix formed of multiple rows and multiple columns in a plane perpendicular to the illumination optical axis 100ax.

The polarization conversion element 140 converts the polarization directions of the sub-light fluxes divided by the first lens array 120 into an aligned polarization direction and outputs substantially one type of linearly polarized sub-light fluxes.

The polarization conversion element 140 includes a polarization separation layer that transmits the portion of the illumination light flux from the light source 110 that has one polarization component (P-polarized component, for example) and reflects the portion of the illumination light flux that has the other polarization component (S-polarized component, for example) in the direction perpendicular to the illumination optical axis 100ax, a reflection layer that reflects the light having the other polarization component that has been reflected off the polarization separation layer in the direction parallel to the illumination optical axis 100ax, and a retardation plate that converts the light having the one polarization component that has passed through the polarization separation layer into light having the other polarization component.

The superimposing lens 150 is an optical element that collects the plurality of sub-light fluxes that have passed through the first lens array 120, the second lens array 130, and the polarization conversion element 140 and superimposes the sub-light fluxes in the vicinity of the image formation area of each of the reflective type of liquid crystal panels 400R, 400G, and 400B. The superimposing lens 150 is disposed in such a way that the optical axis of the superimposing lens 150 substantially coincides with the illumination optical axis 100ax of the illumination system 100. The superimposing lens 150 may be a compound lens comprised of a combination of a plurality of lenses.

The reflection mirror 160 is disposed in such a way that a normal to the reflection plane thereof is inclined by 45 degrees to the optical axis of the superimposing lens 150. The thus disposed reflection mirror 160 reflects the light that exits from the superimposing lens 150 (light oriented in the x (−) direction) in the y (+) direction.

The color separation/light guiding system 200 includes a color separation system 210, reflection mirrors 220 and 260, a dichroic mirror 230, and polarizing beam splitters 240, 250, and 270. The color separation/light guiding system 200 has a function of separating the light reflected off the reflection mirror 160 (the illumination light flux that has exited from the illumination system 100) into red, green, and blue three color light beams and guiding the color light beams to the respective three reflective type of liquid crystal panels 400R, 400G, and 400B, which are illumination target.

The color separation system 210 includes two color separation filters, each of which having a wavelength selecting film formed on a substrate, the wavelength selecting film reflecting a light flux in a predetermined wavelength range and transmitting a light flux in the other wavelength range. The color separation system 210 separates the light reflected off the reflection mirror 160 into light having a blue light component and light having the other color light components (red and green light components).

The light having a blue light component separated by the color separation system 210 is reflected off the reflection mirror 260 and incident on the polarizing beam splitter 270 via a converging lens 300B. Since the illumination light flux from the illumination system 100 has been converted by the polarization conversion element 140 into substantially one type of linearly polarized sub-light fluxes having an aligned polarization direction, the light passing through the converging lens 300B passes through the polarizing beam splitter 270 and is incident on the reflective type of liquid crystal panel for blue light 400B. The converging lens 300B is provided to convert the sub-light fluxes from the illumination system 100 into light fluxes substantially parallel to the respective principal rays. The other converging lenses 300R and 300G are configured in the same manner as the converging lens 300B.

The polarizing beam splitter 270 is a plate-type polarizing beam splitter and has a polarization separation film provided on a light-transmissive substrate. The polarizing beam splitter 270 has a function of transmitting light having one polarization component and reflecting light having the other polarization components. The other polarizing beam splitters 240 and 250 are configured in the same manner as the polarizing beam splitter 270.

The light reflected off the reflective type of liquid crystal panel for blue light 400B reaches the polarizing beam splitter 270. The light that has been modulated by the reflective type of liquid crystal panel 400B so that the polarization direction is rotated is reflected off the polarizing beam splitter 270 and reaches the cross dichroic prism 500. On the other hand, the light that has not been modulated by the reflective type of liquid crystal panel 400B so that the polarization direction is not rotated passes through the polarizing beam splitter 270. That is, such light does not reach the cross dichroic prism 500.

The light having color light components other than the blue light component separated by the color separation system 210 is reflected off the reflection mirror 220 and incident on the dichroic mirror 230.

The dichroic mirror 230 is an optical element having a wavelength selecting film formed on a substrate, the wavelength selecting film reflecting a light flux in a predetermined wavelength range and transmitting a light flux in the other wavelength range. The dichroic mirror 230 is a mirror that reflects the green light component and transmits the red light component.

The light having the green light component reflected off the dichroic mirror 230 passes through the converging lens 300G and the polarizing beam splitter 250 and is incident on the reflective type of liquid crystal panel for green light 400G. On the other hand, the light having the red light component passing through the dichroic mirror 230 passes through the converging lens 300R and the polarizing beam splitter 240 and is incident on the reflective type of liquid crystal panel for red light 400R.

The reflective type of liquid crystal panels 400R, 400G, and 400B are illumination targets illuminated by the illumination system 100 and modulate the illumination light flux in accordance with image information. Each of the reflective type of liquid crystal panels 400R, 400G, and 400B is a wide-vision reflective type of liquid crystal panel in which its image formation area has an aspect ratio of 16:9, and includes, although not illustrated, a light transmissive substrate (ITO) having a light-transmissive electrode, a drive circuit substrate having a pixel electrode, a liquid crystal layer encapsulated and sealed between the light-transmissive substrate and the drive circuit substrate, and orientation films respectively disposed between the light-transmissive electrode and the liquid crystal layer and between the liquid crystal layer and the pixel electrode.

Heat dissipating fins 410R, 410G, and 410B are disposed on the reflective type of liquid crystal panels 400R, 400G, and 400B.

Polarization plate 420R, 420G, and 420B are disposed in front of the cross dichroic prism 500.

The cross dichroic prism 500 is an optical element that combines optical images based on respective modulated color light beams that have exited through the polarization plates 420R, 420G, and 420B to form a color image. The cross dichroic prism 500 is formed by bonding four rectangular prisms and thus has a substantially square shape when viewed from above. Dielectric multilayer films are formed on the substantially X-shaped interfaces between these bonded rectangular prisms. The dielectric multilayer film formed on one of the substantially X-shaped interfaces reflects the blue light, whereas the dielectric multilayer film formed on the other interface reflects the red light. These dielectric multilayer films bend the blue light and the red light, which then travel in the same direction as the green light, so that the three color light beams are combined and the combined light is outputted toward the projection system 600.

The projection system 600 includes, as shown in FIGS. 1 and 3, a first lens group 610 having a plurality of lenses (ten or more lenses, for example), a second lens group 620 having a plurality of lenses (two lenses, for example) and disposed on the light-exiting side of the first lens group 610, a curved mirror 630 disposed on the light-exiting side of the second lens group 620, and a reflective light guiding system 640 disposed along the optical path from the first lens group 610 to the second lens group 620.

Although not illustrated, each of the first lens group 610 and the second lens group 620 is configured as a unit structure in which a plurality of lenses are integrated, and can be adjusted on a unit basis in terms of layout position and angle. The lenses that form each of the lens groups are configured as a unit with the lenses therein adjusted in terms of position and angle.

The plurality of lenses that form each of the first lens group 610 and the second lens group 620 are plastic lenses. Lenses L1 and L2 that form the second lens group 620 are shaped in such a way that part of the lenses L1 and L2 on the upper (z(+) direction) side with respect to the lens optical axis thereof is cut away. To fabricating such a lens with part thereof cut away may include, for example, the following methods can be used as appropriate: a method in which a mold having a predetermined forming surface (forming surface that allows a lens with part thereof cut away to be fabricated) is used to carry out injection molding, and a method in which a rotationally symmetric lens (cylindrical lens) is temporarily fabricated and part of the lens is cut away.

The reflective light guiding system 640 includes a reflection mirror 642 as a first reflection element disposed on the light-exiting side of the first lens group 610, a reflection mirror 644 as a second reflection element disposed above the reflection mirror 642, and a reflection mirror 646 as a third reflection element disposed between the reflection mirror 644 and the second lens group 620. The reflective light guiding system 640 has a function of reflecting the light from the first lens group 610 in a predetermined direction containing the upward direction (z(+) direction) as a vector component and guiding the reflected light to the curved mirror 630. Each of the reflection mirrors 642, 644, and 646 has a flat reflection plane.

The reflection mirror 642 is disposed in such a way that a normal to the reflection plane thereof is inclined by 45 degrees to the optical axis of the first lens group 610. The thus disposed reflection mirror 642 reflects the light that exits from the first lens group 610 (the light oriented in the y (+) direction) upward (in the z (+) direction).

The reflection mirror 644 is disposed in such a way that a normal to the reflection plane of the reflection mirror 644 is perpendicular to a normal to the reflection plane of the reflection mirror 642. The thus disposed reflection mirror 644 reflects the light reflected off the reflection mirror 642 (the light oriented in the z (+) direction) in the y (−) direction.

The reflection mirror 646 is disposed above the first lens group 610 in such a way that a normal to the reflection plane of the reflection mirror 646 is inclined by 45 degrees to the central axis of the light reflected off the reflection mirror 644. The thus disposed reflection mirror 646 reflects the light reflected off the reflection mirror 644 (the light oriented in the y (−) direction) in the x (+) direction.

The reflection mirrors 642, 644, and 646 are adjusted in terms of layout position and angle and then fixed to a fixing member (not shown). That is, the reflective light guiding system 640 is configured as a unit structure in which the reflection mirrors 642, 644, and 646 are integrated.

The curved mirror 630 is a concave mirror and disposed with its layout position and angle adjusted in such a way that the light that exits from the second lens group 620 is projected on the screen SCR. The curved mirror 630 is also disposed in such a way that the optical axis of the curved mirror 630 is twisted with respect to the optical axis of the first lens group 610, that is, the optical axis of the curved mirror 630 does not intersect the optical axis of the first lens group 610 (see FIG. 1).

The optical axis of the curved mirror 630 means the central axis of rotation around which the concave plane of the curved mirror 630 is rotated to form a rotationally symmetric body.

The thus configured projection system 600 enlarges and projects a color image that exits from the cross dichroic prism 500 to form a large-screen image on the screen SCR.

A description will be made of the relationship between a projection image projected on the screen SCR and the reflective type of liquid crystal panels 400R, 400G, and 400B in the projector 1000 according to the first embodiment with reference to FIGS. 4A to 4D.

Figure 4A:
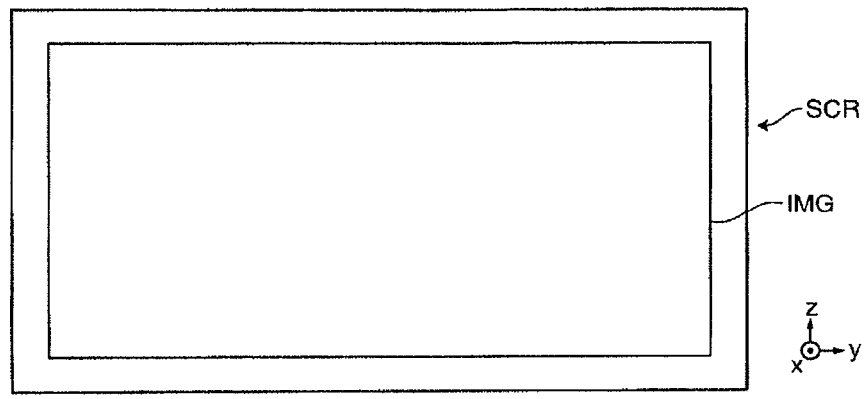
FIGS. 4A to 4D explain the relationship between a projection image IMG projected on a screen SCR and reflective type of liquid crystal panels 400R, 400G, and 400B.
Figure 4B:
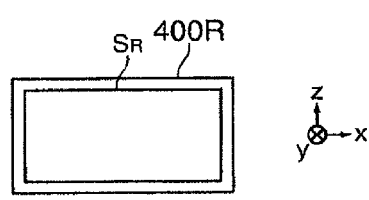
Figure 4C:
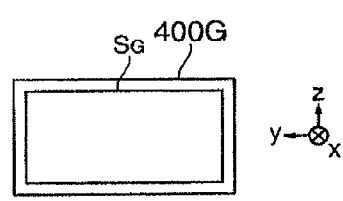
Figure 4D:
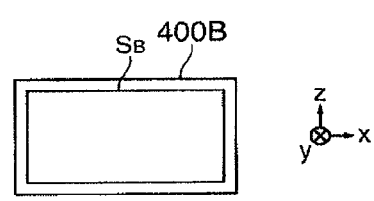

FIGS. 4A to 4D explain the relationship between a projection image IMG projected on the screen SCR and the reflective type of liquid crystal panels 400R, 400G, and 400B. FIG. 4A shows the screen SCR viewed from the front (the x (+) direction). FIG. 4B shows the reflective type of liquid crystal panel 400R viewed from the front (the y (−) direction). FIG. 4C shows the reflective type of liquid crystal panel 400G viewed from the front (the x (−) direction). FIG. 4D shows the reflective type of liquid crystal panel 400B viewed from the front (the y (−) direction). The size of the screen SCR shown in FIG. 4A and the sizes of the reflective type of liquid crystal panels 400R, 400G, and 4003 shown in FIGS. 4B to 4D are exaggerated.

The projection image IMG projected on the screen SCR is a wide-vision image having an aspect ratio of 16:9. As shown in FIG. 4A, the longitudinal direction of the projection image IMG extends along the y direction, and the short-side direction extends along the z direction.

On the other hand, the reflective type of liquid crystal panels 400R, 400G, and 400B are disposed, as shown in FIGS. 4B to 4D, in such a way that the longitudinal directions of the image formation areas $S_R$, $S_G$, and $S_B$ extend along the x or y direction (do not extend along the z direction).

Before describing the projector 1000 according to the first embodiment in more detail, a projector 1000a according to a comparative example (related art) of the first embodiment will be described.

Figure 5:
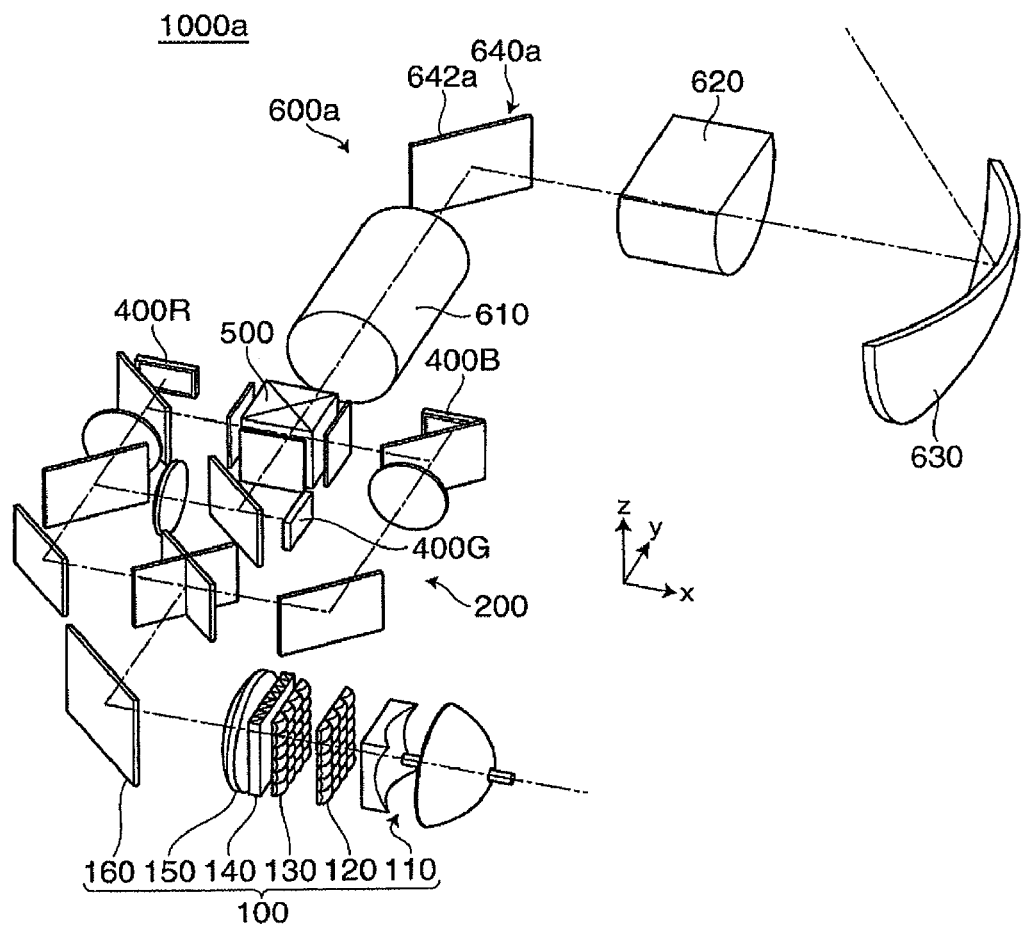
FIG. 5 is an overall perspective view showing the optical system of a projector 1000a according to the comparative example.
Figure 6:
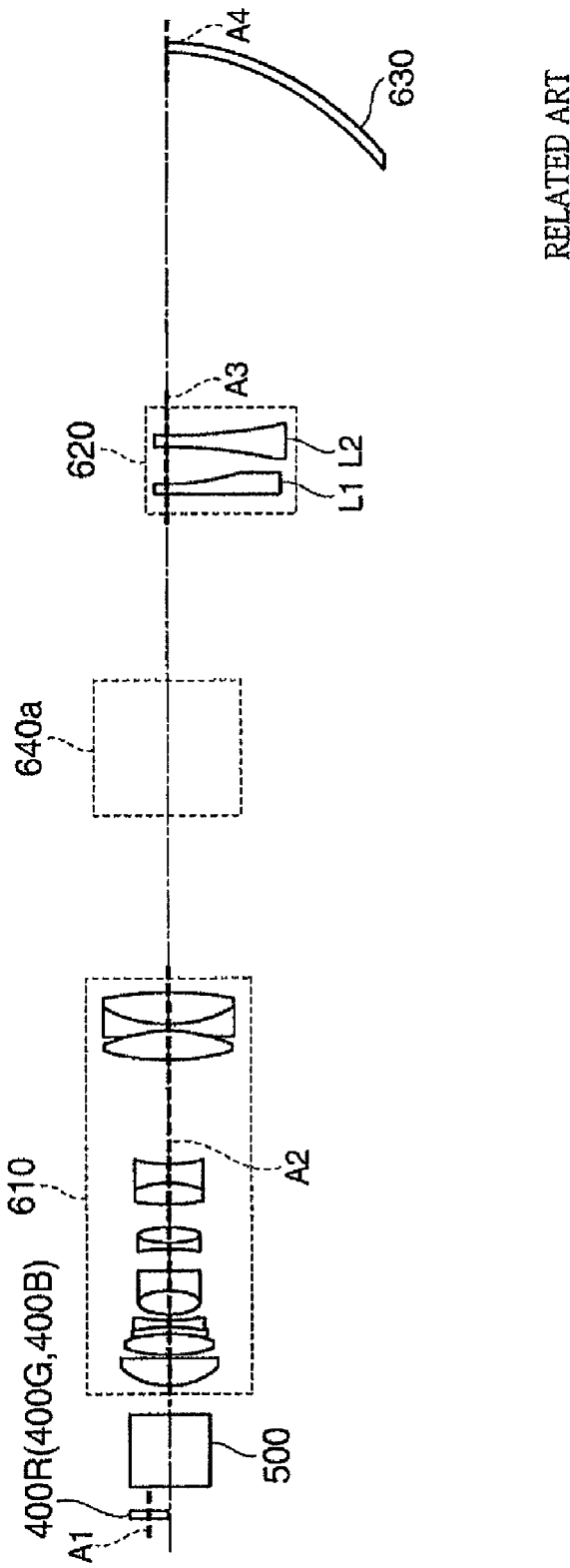
FIG. 6 explains the projector 1000a according to the comparative example.

FIG. 5 is an overall perspective view showing the optical system of the projector 1000a according to the comparative example. FIG. 6 explains the projector 1000a according to the comparative example. In FIG. 6, the optical path folded at a reflection mirror 642a is unfolded in order to illustrate two-dimensionally the positional relationship along the z direction among the optical components present in the area between reflective type of liquid crystal panels 400R, 400G, 400B and a curved mirror 630.

In FIG. 5, the same members as those in FIG. 1 have the same reference characters and no detailed description of such members will be made.

The projector 1000a according to the comparative example is basically configured in a manner quite similar to the projector 1000 according to the first embodiment, but differs therefrom in terms of the configuration of the reflective light guiding system.

As the reflective light guiding system, the projector 1000a according to the comparative example includes, as shown in FIG. 5, a reflective light guiding system 640a disposed between a first lens group 610 and a second lens group 620, the reflective light guiding system 640a reflecting the light from the first lens group 610 in the x (+) direction as a third direction and guiding the reflected light to the curved mirror 630. The curved mirror 630 is disposed in such a way that the optical axis of the curved mirror 630 intersects the optical axis of the first lens group 610.

The reflective light guiding system 640a includes the reflection mirror 642a disposed on the light-exiting side of the first lens group 610 in such a way that a normal to the reflection plane of the reflection mirror 642a is inclined by 45 degrees to the optical axis of the first lens group 610. The thus disposed reflection mirror 642a reflects the light that exits from the first lens group 610 (the light oriented in the y (+) direction) sideward (in the x (+) direction).

In the positional relationship along the z direction among the optical components present in the area between the reflective type of liquid crystal panels 400R, 400G, 400B and the curved mirror 630 in the projector 1000a according to the comparative example, as seen from FIG. 6, the first lens group 610, the second lens group 620, and the curved mirror 630 are disposed in such a way that the optical axis A2 of the first lens group 610, the optical axis A3 of the second lens group 620, and the optical axis A4 of the curved mirror 630 are shifted downward (in the z(−) direction) from the central axis A1 of the image formation areas of the reflective type of liquid crystal panels 400R, 400G, and 4003. Further, the optical axis A2 of the first lens group 610, the optical axis A3 of the second lens group 620, and the optical axis A4 of the curved mirror 630 are configured to be present in the same plane.

Since the thus configured projector 1000a according to the comparative example includes the reflective light guiding system 640a configured as described above, the space in which a projection system 600a is disposed can be reduced (more compact) as compared to that in related art, whereby the projector 1000a can be more compact. In this case, however, since the curved mirror 630 is disposed in a position shifted downward (in the z(−) direction) from the reflective type of liquid crystal panels 400R, 400G, and 400B (first lens group 610), part of the light reflected off the curved mirror 630 may disadvantageously hit an optical system and other components. To prevent the light reflected off the curved mirror 630 from hitting the optical system, for example, the location where the optical system and other components are disposed must be changed, which is not preferable because the degrees of freedom in product design are reduced.

In contrast, in the projector 1000 according to the first embodiment, since the reflective light guiding system 640 comprised of three reflection mirrors 642, 644, and 646 is disposed along the optical path between the first lens group 610 and the curved mirror 630, the light from the first lens group 610 can be bent three times and guided to the curved mirror 630. As a result, the space in which the projection system 600 is disposed can be reduced (more compact) as compared to the case, for example, in the configuration of a projector of related art, where the light from the first lens group is not bent at all but directly guided to the curved mirror, whereby the projector 1000 can be more compact.

Figure 7:
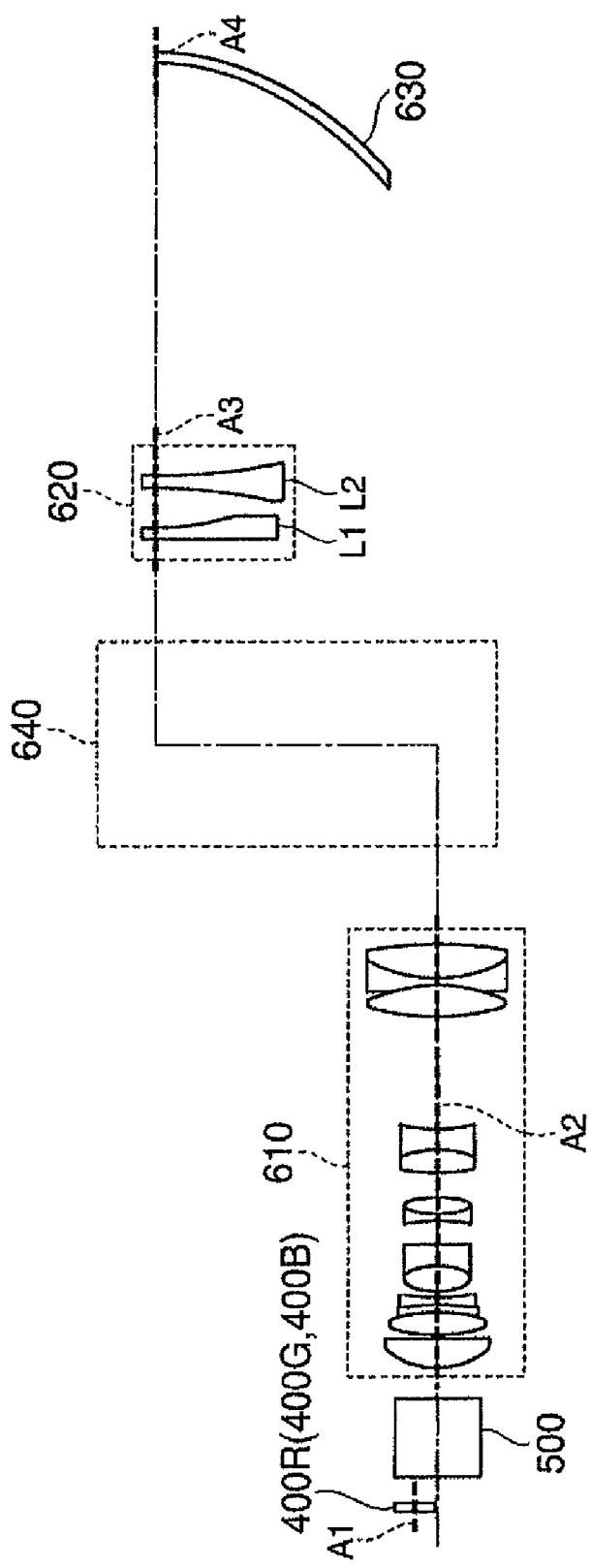
FIG. 7 explains the projector 1000 according to the first embodiment.

FIG. 7 explains the projector 1000 according to the first embodiment. In FIG. 7, part of the folded optical path is unfolded, as in FIG. 6, in order to illustrate two-dimensionally the positional relationship along the z direction among the optical components present in the area between the reflective type of liquid crystal panels 400R, 400G, 400B and the curved mirror 630.

In the projector 1000 according to the first embodiment, as seen from FIG. 7, the first lens group 610 is disposed in such a way that the optical axis A2 of the first lens group 610 is shifted downward (in the z (−) direction) from the central axis A1 of the image formation areas of the reflective type of liquid crystal panels 400R, 400G, and 400B. The second lens group 620 and the curved mirror 630 are disposed in such a way that the optical axis A3 of the second lens group 620 and the optical axis A4 of the curved mirror 630 are shifted upward (in the z(+) direction) from the optical axis A2 of the first lens group 610. In other words, the optical axis A3 of the second lens group 620 and the optical axis A4 of the curved mirror 630 are present in the same plane, but the optical axis A2 of the first lens group 610 is not present in that plane.

Therefore, in the projector 1000 according to the first embodiment, since the curved mirror 630 is disposed in a position shifted upward (in the z(+) direction) from the reflective type of liquid crystal panels 400R, 400G, and 400B (first lens group 610), the light reflected off the curved mirror 630 will not hit the optical system. It is therefore possible to achieve a projector in which a large number of degrees of freedom are available in product design.

In the projector 1000 according to the first embodiment, since the reflection mirrors 642, 644, and 646 that form the reflective light guiding system 640 have flat reflection planes, the structure of the reflective light guiding system 640 is simpler and the reflection mirrors can be smaller than in the case where the reflection planes are curved. Such an advantage contributes to reduction in size of the product.

In the projector 1000 according to the first embodiment, since the optical axis A2 of the first lens group 610 does not intersect the optical axis A4 of the curved mirror 630, it is possible to achieve a projector in which a large number of degrees of freedom are available in product design.

In the projector 1000 according to the first embodiment, two of the optical axis A2 of the first lens group 610, the optical axis A3 of the second lens group 620, and the optical axis A4 of the curved mirror 630 (the optical axis A3 of the second lens group 620 and the optical axis A4 of the curved mirror 630 in the first embodiment) are present in the same plane, but the one remaining optical axis (the optical axis A2 of the first lens group 610 in the first embodiment) is not present in that plane. Such a configuration allows the space in the projector 1000 to be effectively used and the projector 1000 to be more compact, readily prevents the light reflected off the curved mirror 630 from hitting the optical system, and allows a projector in which a large number of degrees of freedom are available in product design to be achieved.

In the projector 1000 according to the first embodiment, since the reflective light guiding system 640 is configured as a unit structure in which the three reflection mirrors 642, 644, and 646 are integrated, the apparatus is readily assembled.

In the projector 1000 according to the first embodiment, since each of the first lens group 610 and the second lens group 620 is configured as a unit structure in which a plurality of lenses are integrated, the apparatus is readily assembled.

In the projector 1000 according to the first embodiment, since the reflective light guiding system 640 includes the reflection mirrors 642, 644, and 646 disposed and configured as described above, it is possible to readily achieve a projector that is more compact and has a larger number of degrees of freedom in product design than related art.

In the projector 1000 according to the first embodiment, since each of the reflection elements in the reflective light guiding system 640 is a reflection mirror, the light from the first lens group 610 can be reliably guided to the curved mirror 630. Further, the manufacturing cost of the projector 1000 can be reduced as compared to a case where the reflection elements are reflection prisms.

In the projector 1000 according to the first embodiment, since the curved mirror 630 is a concave mirror, the product height of the projector 1000 can be lower than in a case where the curved mirror is, for example, a convex mirror.

In the projector 1000 according to the first embodiment, the lenses L1 and L2 that form the second lens group 620 are shaped in such a way that part of the lenses L1 and L2 on the upper (z(+) direction) side with respect to the lens optical axis thereof is cut away. Such a configuration allows the weight of the lenses to be reduced and the space in the projector 1000 to be effectively used. Further, since the portions cut away from the lenses L1 and L2 are regions through which the light reflected off the reflection mirror 646 does not pass, there are no problems resulting from the cutting, for example, no light guiding path.

Second to Fourth Embodiments

In second to fourth embodiments, cases where the reflective light guiding system includes two reflection elements are described.

Figure 8:
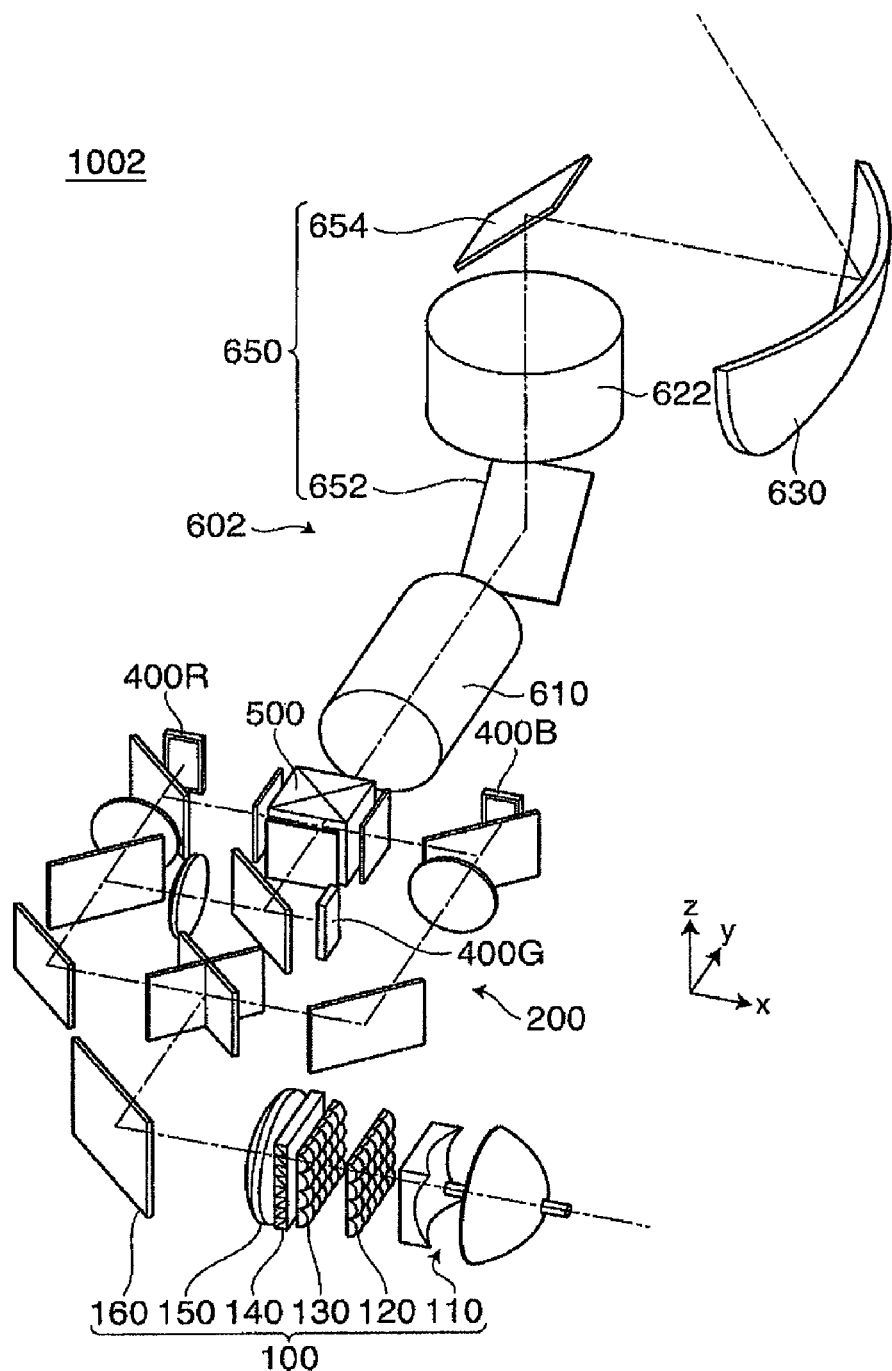
FIG. 8 is an overall perspective view showing the optical system of a projector 1002 according to a second embodiment.
Figure 9A:
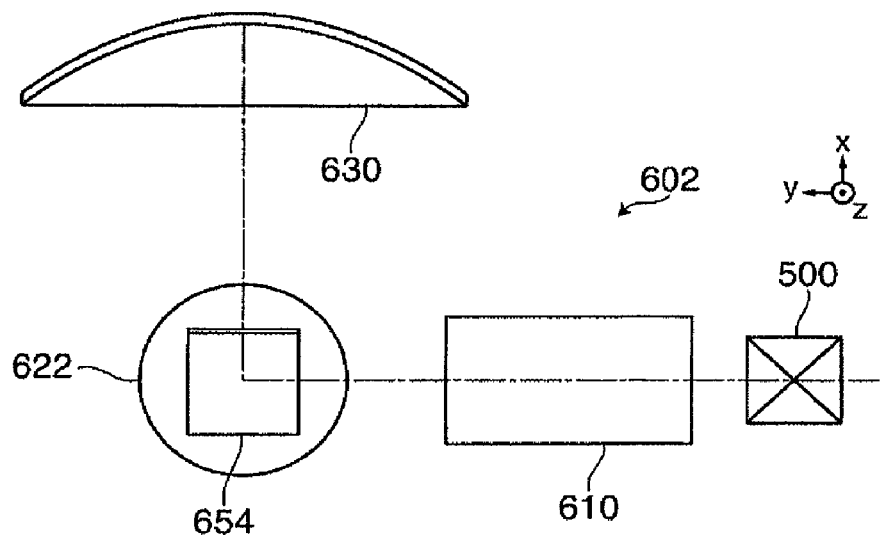
FIGS. 9A and 9B explain a projection system 602.
Figure 9B:
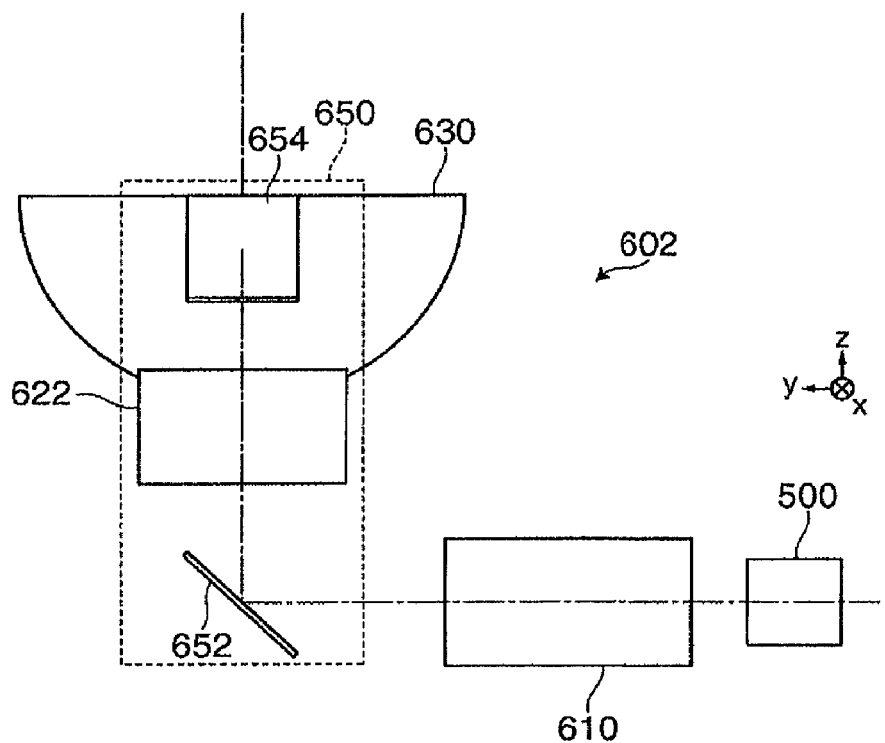

FIG. 8 is an overall perspective view showing the optical system of a projector 1002 according to the second embodiment. FIGS. 9A and 9B explain a projection system 602. FIG. 9A is a top view of the projection system 602 (viewed from the z (+) direction). FIG. 9B is a side view of the projection system 602 (viewed from the x (−) direction).

Figure 10:
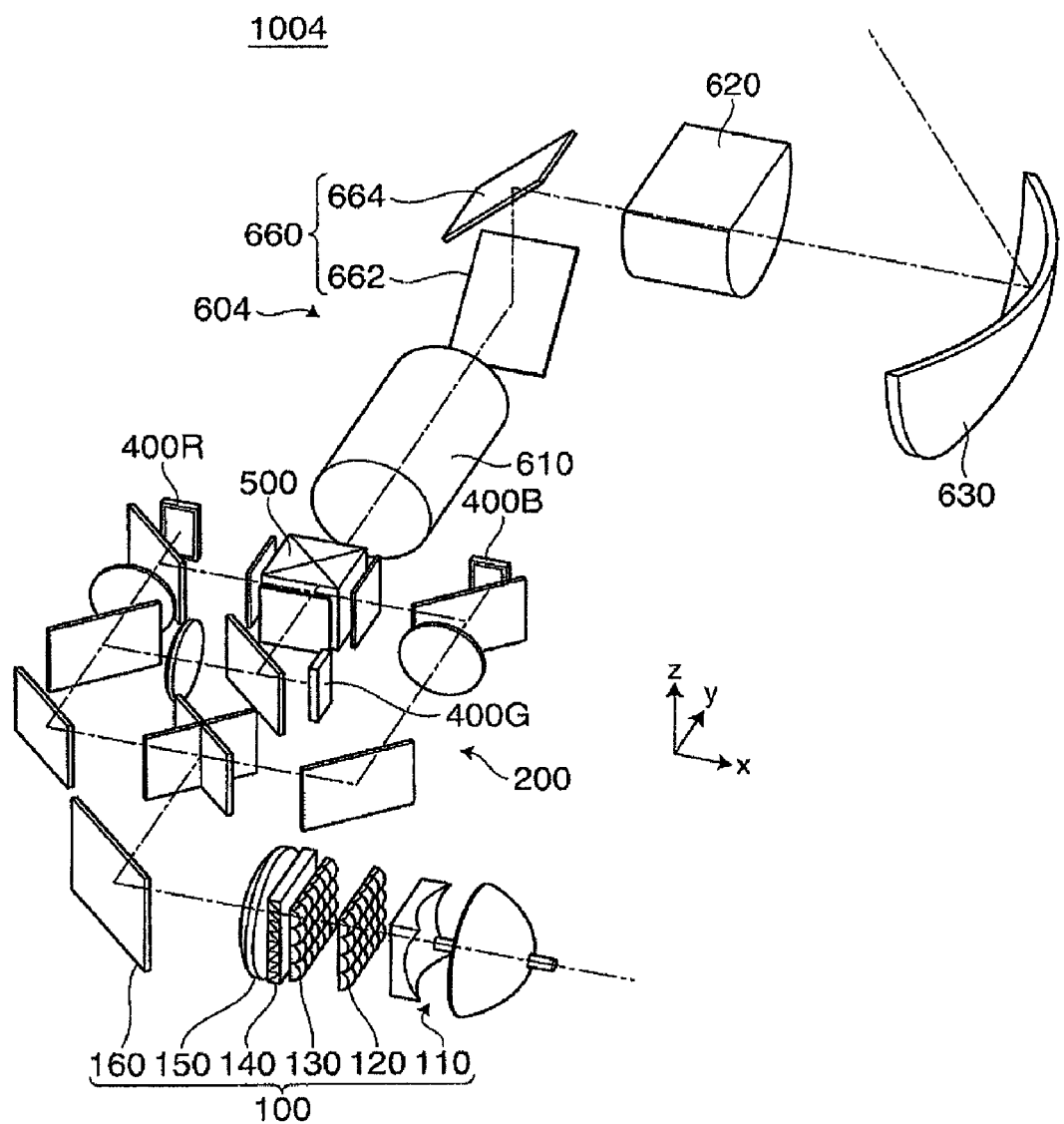
FIG. 10 is an overall perspective view showing the optical system of a projector 1004 according to a third embodiment.
Figure 11A:
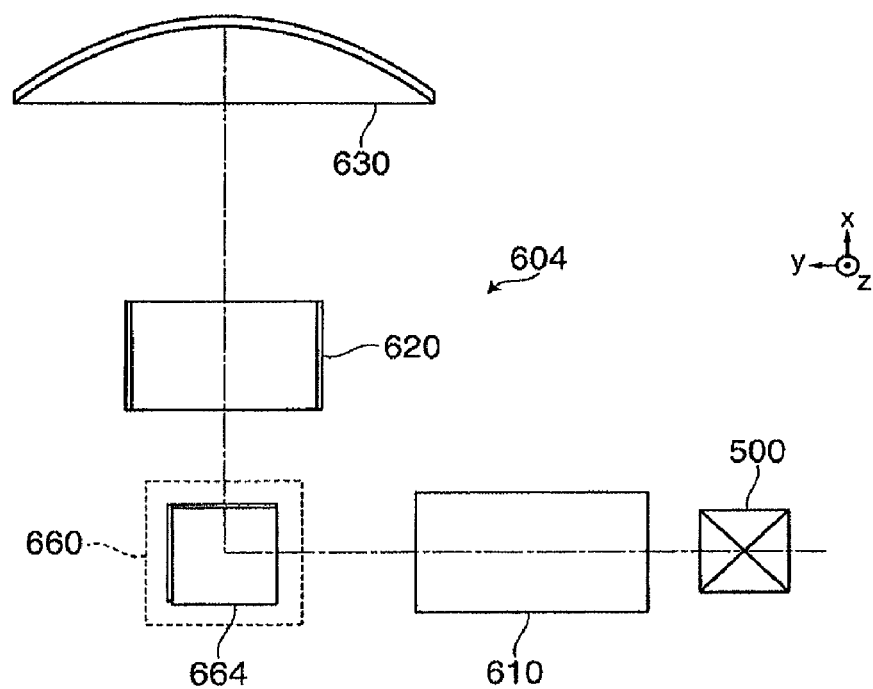
FIGS. 11A and 11B explain a projection system 604.
Figure 11B:
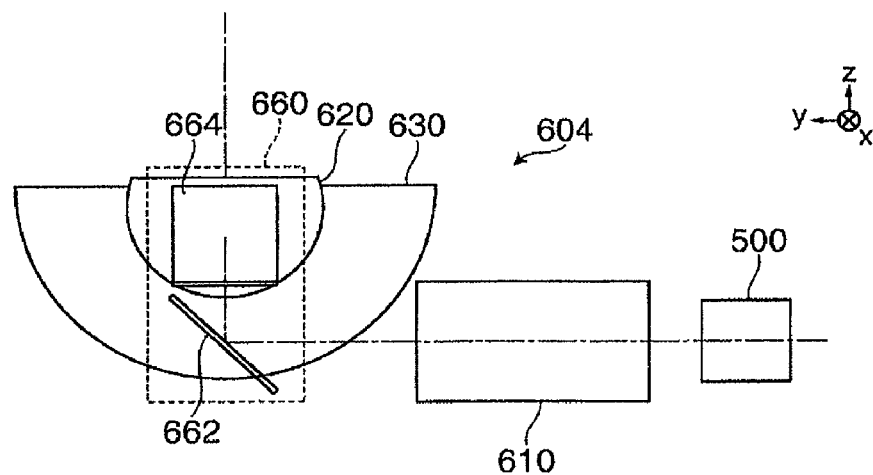

FIG. 10 is an overall perspective view showing the optical system of a projector 1004 according to the third embodiment. FIGS. 11A and 11B explain a projection system 604. FIG. 11A is a top view of the projection system 604 (viewed from the z (+) direction). FIG. 11B is a side view of the projection system 604 (viewed from the x (−) direction).

Figure 12:
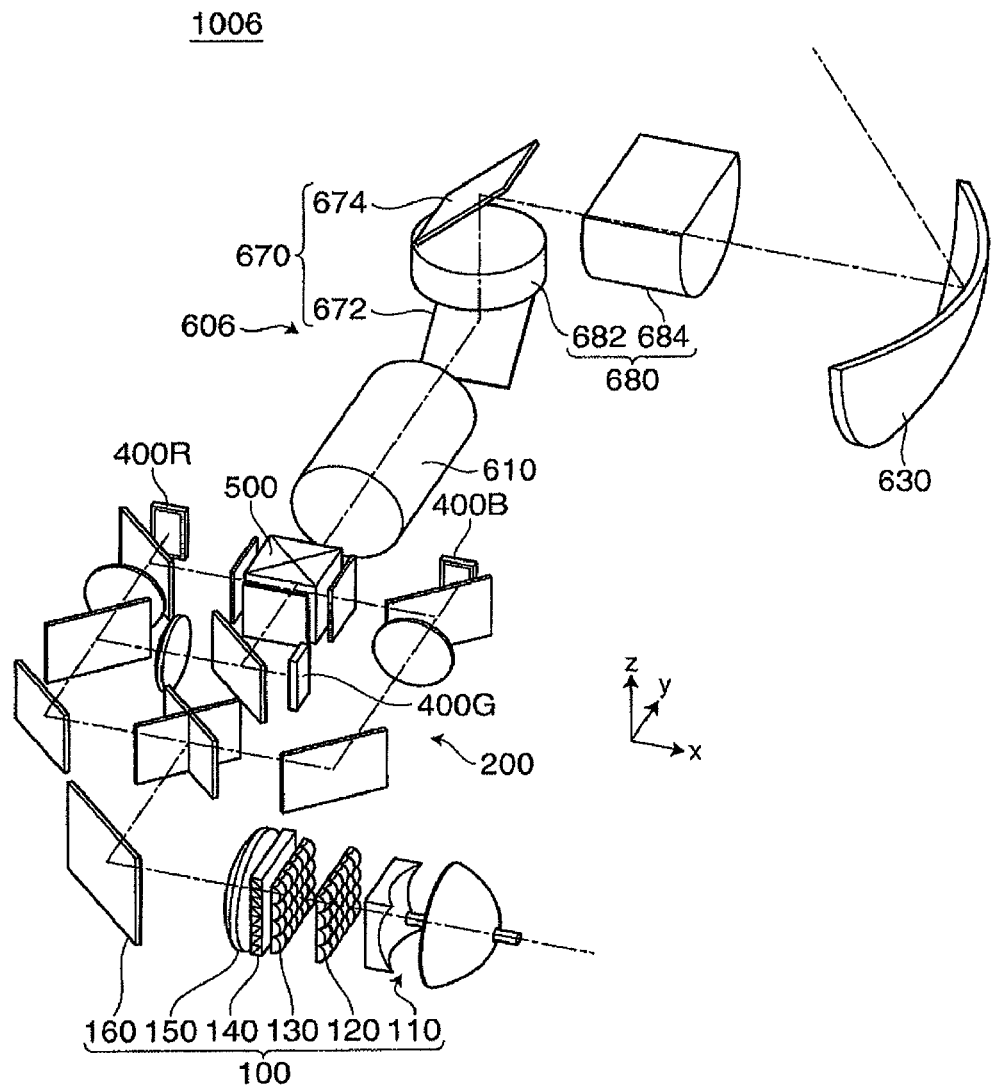
FIG. 12 is an overall perspective view showing the optical system of a projector 1006 according to a fourth embodiment.
Figure 13A:
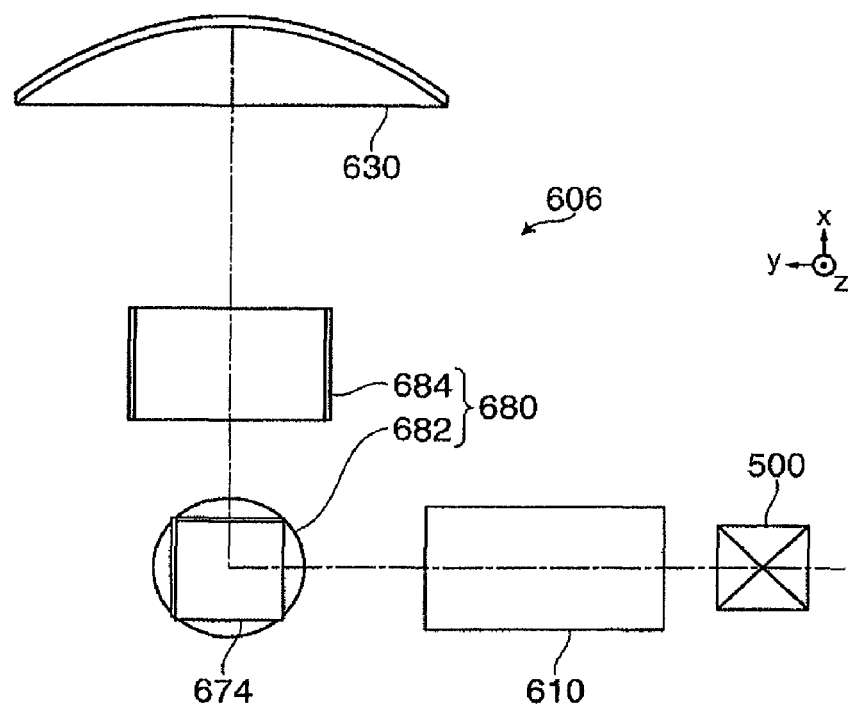
FIGS. 13A and 13B explain a projection system 606.
Figure 13B:
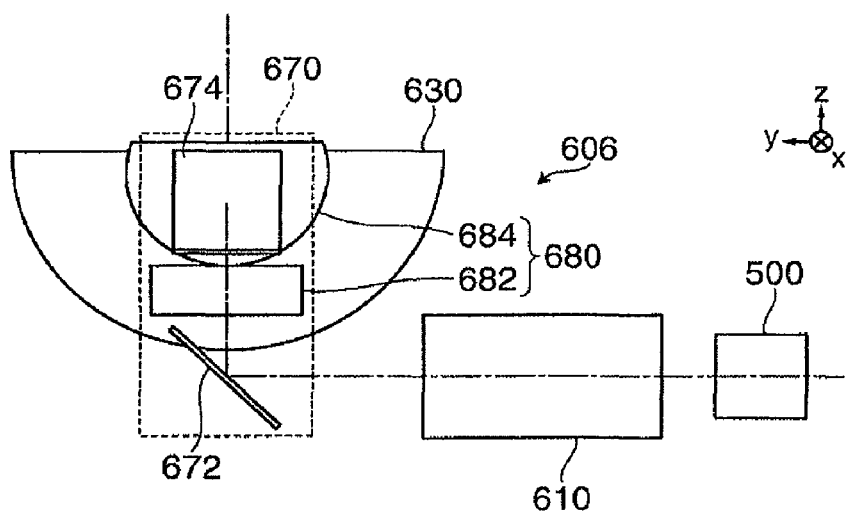

FIG. 12 is an overall perspective view showing the optical system of a projector 1006 according to the fourth embodiment. FIGS. 13A and 13B explain a projection system 606. FIG. 13A is a top view of the projection system 606 (viewed from the z (+) direction). FIG. 13B is a side view of the projection system 606 (viewed from the x (−) direction).

In FIGS. 8 to 13A and 13B, the same members as those in FIGS. 1, 3A, and 3B have the same reference characters and no detailed description of such members will be made. In FIGS. 8 to 13A and 13B, a plurality of lenses that form a first lens group 610 and a second lens group 620 are abstractly illustrated.

Figure 14A:
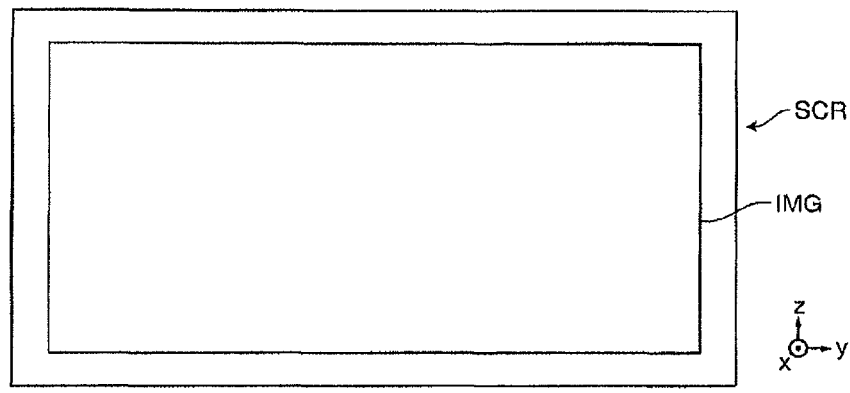
FIGS. 14A to 14D explain the relationship between a projection image IMG projected on a screen SCR and reflective type of liquid crystal panels 400R, 400G, and 400B in the second to fourth embodiments.
Figure 14B:
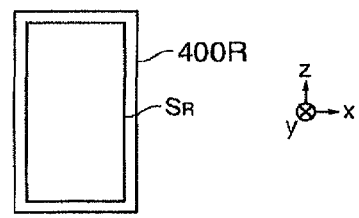
Figure 14C:
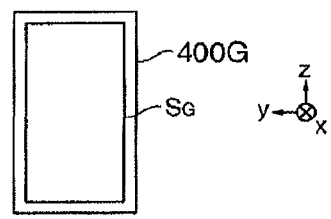
Figure 14D:
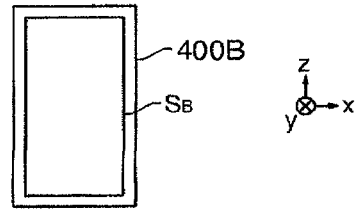

FIGS. 14A to 14D explain the relationship between a projection image IMG projected on a screen SCR and reflective type of liquid crystal panels 400R, 400G, and 400B in the second to fourth embodiments. FIG. 14A shows the screen SCR viewed from the front (the x (+) direction). FIG. 14B shows the reflective type of liquid crystal panel 400R viewed from the front (the y (−) direction). FIG. 14C shows the reflective type of liquid crystal panel 400G viewed from the front (the x (−) direction). FIG. 14D shows the reflective type of liquid crystal panel 400B viewed from the front (the y (−) direction).

The size of the screen SCR shown in FIG. 14A and the sizes of the reflective type of liquid crystal panels 400R, 400G, and 400B shown in FIGS. 14B to 14D are exaggerated. In FIGS. 14A to 14D, the same members as those in FIGS. 4A to 4D have the same reference characters and no detailed description of such members will be made.

The projectors 1002 1004 and 1006 according to the second to fourth embodiments basically have configurations similar to that of the projector 1000 according to the first embodiment but differ therefrom in terms of the configuration of the projection system.

That is, the projector 1002 according to the second embodiment includes as the projection system, as shown in FIGS. 8, 9A, and 9B, the projection system 602 having a first lens group 610, a second lens group 622 disposed on the light-exiting side of the first lens group 610, a curved mirror 630 disposed on the light-exiting side of the second lens group 622, and a reflective light guiding system 650 disposed along the optical path from the first lens group 610 to the curved mirror 630. The second lens group 622 is disposed in such a way that the optical axis of the second lens group 622 extends along the z direction. The second lens group 622 has substantially the same configuration as that of the second lens group 620 described in the first embodiment, but differs therefrom in that part of the lenses that form the second lens group 622 is not cut away.

The reflective light guiding system 650 includes a reflection mirror 652 as a first reflection element disposed between the first lens group 610 and the second lens group 622, and a reflection mirror 654 as a second reflection element disposed between the second lens group 622 and the curved mirror 630. The reflective light guiding system 650 has a function of reflecting the light from the first lens group 610 in a predetermined direction containing the upward direction (z(+) direction) as a vector component and guiding the light to the curved mirror 630. Each of the reflection mirrors 652 and 654 has a flat reflection plane.

The reflection mirror 652 is disposed in such a way that a normal to the reflection plane thereof is inclined by 45 degrees to the optical axis of the first lens group 610. The thus disposed reflection mirror 652 reflects the light that exits from the first lens group 610 (the light oriented in the y (+) direction) upward (in the z (+) direction).

The reflection mirror 654 is disposed above the second lens group 622 in such a way that a normal to the reflection plane of the reflection mirror 654 is inclined by 45 degrees to the central axis of the light that exits from the second lens group 622. The thus disposed reflection mirror 654 reflects the light that exits from the second lens group 622 (the light oriented in the z (+) direction) in the x (+) direction.

The projector 1004 according to the third embodiment includes as the projection system, as shown in FIGS. 10, 11A, and 11B, the projection system 604 having a first lens group 610, a second lens group 620 disposed on the light-exiting side of the first lens group 610, a curved mirror 630 disposed on the light-exiting side of the second lens group 620, and a reflective light guiding system 660 disposed between the first lens group 610 and the second lens group 620. The second lens group 620 is disposed in such a way that the optical axis of the second lens group 620 extends along the x direction.

The reflective light guiding system 660 includes a reflection mirror 662 as a first reflection element disposed on the light-exiting side of the first lens group 610, and a reflection mirror 664 as a second reflection element disposed between the reflection mirror 662 and the second lens group 620. The reflective light guiding system 660 has a function of reflecting the light from the first lens group 610 in a predetermined direction containing the upward direction (z(+) direction) as a vector component and guiding the light to the curved mirror 630. Each of the reflection mirrors 662 and 664 has a flat reflection plane.

The reflection mirror 662 is disposed in such a way that a normal to the reflection plane thereof is inclined by 45 degrees to the optical axis of the first lens group 610. The thus disposed reflection mirror 662 reflects the light that exits from the first lens group 610 (the light oriented in the y (+) direction) upward (in the z (+) direction).

The reflection mirror 664 is disposed above the reflection mirror 662 in such a way that a normal to the reflection plane of the reflection mirror 664 is inclined by 45 degrees to the central axis of the light reflected off the reflection mirror 662. The thus disposed reflection mirror 664 reflects the light reflected off the reflection mirror 662 (the light oriented in the z (+) direction) in the x (+) direction.

In the third embodiment, the size of the projector 1004 is reduced by reducing the distance between the reflection mirror 662 and the reflection mirror 664 to the smallest possible distance.

The projector 1006 according to the fourth embodiment includes as the projection system, as shown in FIGS. 12, 13A, and 133, the projection system 606 having a first lens group 610, a lens group 680 disposed on the light-exiting side of the first lens group 610, a curved mirror 630 disposed on the light-exiting side of the lens group 680, and a reflective light guiding system 670 disposed along the optical path from the first lens group 610 and the curved mirror 630. The lens group 680 includes a second lens group 682 and a third lens group 684. Each of the two lens groups 682 and 684 is configured as a unit structure in which a plurality of lenses are integrated. The second lens group 682 is disposed in such a way that the optical axis of the second lens group 682 extends along the z direction, and the third lens group 684 is disposed in such a way that the optical axis of the third lens group 684 extends along the x direction.

The reflective light guiding system 670 includes a reflection mirror 672 as a first reflection element disposed on the light-exiting side of the first lens group 610, and a reflection mirror 674 as a second reflection element disposed between the second lens group 682 and the third lens group 684. The reflective light guiding system 670 has a function of reflecting the light from the first lens group 610 in a predetermined direction containing the upward direction (z(+) direction) as a vector component and guiding the light to the curved mirror 630. Each of the reflection mirrors 672 and 674 has a flat reflection plane.

The reflection mirror 672 is disposed in such a way that a normal to the reflection plane thereof is inclined by 45 degrees to the optical axis of the first lens group 610. The thus disposed reflection mirror 672 reflects the light that exits from the first lens group 610 (the light oriented in the y (+) direction) upward (in the z (+) direction).

The reflection mirror 674 is disposed above the second lens group 682 in such a way that a normal to the reflection plane of the reflection mirror 674 is inclined by 45 degrees to the central axis of the light that exits from the second lens group 682. The thus disposed reflection mirror 674 reflects the light that exits from the second lens group 682 (the light oriented in the z (+) direction) in the x (+) direction.

The projectors 1002 to 1006 according to the second to fourth embodiments not only differ from the projector 1000 according to the first embodiment in terms of the configuration of the projection system as described above, but also differ from the projector 1000 according to the first embodiment in terms of the layout of the reflective type of liquid crystal panels.

That is, in the projectors 1002 to 1006 according to the second to fourth embodiments, as shown in FIGS. 8, 10, and 12, each of the reflective type of liquid crystal panels 400R, 400G, and 400B is rotated by 90 degrees around the central axis of the image formation area as the axis of rotation in such a way that the longitudinal direction of the image formation area extends along the z direction.

Referring to FIGS. 14A to 14D, a projection image IMG projected on the screen SCR is a wide-vision image having an aspect ratio of 16:9, as in the first embodiment. As shown in FIG. 14A, the projection image IMG is formed in such a way that the longitudinal direction extends along the y direction and the short-side direction extends along the z direction. On the other hand, the reflective type of liquid crystal panels 400R, 400G, and 400B are disposed, as shown in FIGS. 14B to 14D, in such a way that the longitudinal directions of the image formation areas $S_R$ $S_G$, and $S_B$ extend along the z direction (do not extend along the x or y direction).

In the projectors 1002 to 1006 according to the second to fourth embodiments, not only is the layout of the reflective type of liquid crystal panels 400R, 400B, and 400G changed, but also the layout of the first lens array 120, the second lens array 130, and the polarization conversion element 140 in the illumination system 100 is changed. Specifically, as shown in FIGS. 8, 10, and 12, the first lens array 120, the second lens array 130, and the polarization conversion element 140 are rotated by 90 degrees around the respective central axes of the above optical members as the axes of rotation.

As described above, although the projectors 1002 to 1006 according to the second to fourth embodiments differ from the projector 1000 according to the first embodiment in terms of the configuration of the projection system, the layout of the reflective type of liquid crystal panels, and the layout of part of the optical components in the illumination system, the projectors 1002 to 1006 include the reflective light guiding systems 650 to 70 having the two respective reflection mirrors 652, 654, 662, 664, 672, and 674 as reflection elements, reflecting the light from the first lens group 610 in a predetermined direction containing the upward direction (z(+) direction) as a vector component, and guiding the light to the curved mirror 630, as in the projector 1000 according to the first embodiment, whereby the spaces in which the projection systems 602 to 606 are disposed can be smaller (more compact) and hence the projectors 1002 to 1006 can be more compact than projectors of related art.

As described above, the projectors 1002 to 1006 according to the second to fourth embodiments are configured in such a way that the longitudinal direction of the projection image IMG projected on the screen SCR (y direction) does not coincide with the longitudinal directions of the image formation areas $S_R$, $S_G$, and $S_B$ of the reflective type of liquid crystal panels 400R, 400G, and 400B (z direction), because in the projection system 600 of the projector 1000 according to the first embodiment, the light oriented in the z(+) direction is temporarily reflected off the reflection mirror 644 in the y(−) direction and then reflected off the reflection mirror 646 in the x(+) direction, while in the projection systems 602, 604, and 606 of the projectors 1002 to 1006 according to the second to fourth embodiments, the light oriented in the z(+) direction is reflected off the reflection mirrors 654, 664, and 674 directly in the x(+) direction. In the thus configured projectors 1002 to 1006 according to the second to fourth embodiments, when the optical systems from the illumination system 100 to the cross dichroic prism 500 are disposed in such a way that the system optical axis of the optical systems from the illumination system 100 to the cross dichroic prism 500 extends along the x-y plane, disposing the reflective type of liquid crystal panels 400R, 400G, and 400B in such a way that the longitudinal directions of the image formation areas $S_R$, $S_G$, and $S_B$ extend along the z direction allows the images of the vertically elongated reflective type of liquid crystal panels 400R, 400G, and 400B to be correctly projected on the screen SCR as projection images IMG whose longitudinal directions extend along the y direction. Since disposing the reflective type of liquid crystal panels 400R, 400G, and 400B in such a way that the image formation areas $S_R$, $S_G$, and $S_B$ are vertically elongated (elongated along the z direction) allows the sizes of the cross dichroic prism 500 in the x and y directions to be reduced as compared to a case where the reflective type of liquid crystal panels 400R, 400G, and 400B are disposed in such a way that the image formation areas $S_R$, $S_G$, and $S_B$ are horizontally elongated (elongated along the x or y direction), the length of the optical path in the color separation/light guiding system 200 is reduced, whereby the back focal distances of the projection systems 602 to 606 can be reduced and hence the sizes of the projection systems 602 to 606 can be advantageously further reduced.

Each of the projection systems 602 to 606 in the second to fourth embodiments can also be used to project a projection image IMG whose longitudinal direction extends along the y direction on the screen SCR not only by disposing the optical systems from the illumination system 100 to the cross dichroic prism 500 in such a way that color separation in the color separation/light guiding system 200 is performed along the vertical direction (z direction) and the system optical axis of the optical systems from the illumination system 100 to the cross dichroic prism 500 extends along the y-z plane but also by disposing the reflective type of liquid crystal panels 400R, 400G, and 400B in such a way that the longitudinal directions of the image formation areas $S_R$ $S_G$, and $S_B$ extend along the z direction. In this case, however, in the entire optical system from the illumination system 100 to each of the projection systems 602 to 606, the lengths along the x and y directions will not be greatly reduced, but the length along the z direction disadvantageously increases.

In contrast, in each of the projectors 1002 to 1006 according to the second to fourth embodiments, since not only are the optical systems from the illumination system 100 to the cross dichroic prism 500 disposed in such a way that color separation in the color separation/light guiding system 200 is performed along the horizontal direction (x or y direction) and the system optical axis from the illumination system 100 to the cross dichroic prism 500 extends along the x-y plane, but also the reflective type of liquid crystal panels 400R, 400G, and 400B are disposed in such a way that the longitudinal directions of the image formation areas $S_R$, $S_G$, and $S_B$ extend along the z direction, each of the projection systems 602 to 606 can project a horizontally elongated projection image IMG (whose longitudinal direction is parallel to the y direction) on the screen SCR while the length of the entire optical system from the illumination system 100 to each of the projection systems 602 to 606 along the z direction does not increase but remains compact.

Since the projectors 1002 to 1006 according to the second to fourth embodiments have a configuration similar to that of the projector 1000 according to the first embodiment but only differ therefrom in terms of the configuration of the projection system, the layout of the reflective type of liquid crystal panels, and the layout of part of the optical components in the illumination system, the projectors 1002 to 1006 have relevant advantageous effects of those provided in the projector 1000 according to the first embodiment.

While the projectors of some aspects of the invention have been described with reference to the above embodiments, the invention is not limited thereto, but can be implemented in a variety of aspects to the extent that they do not depart from the spirit of the invention. For example, the following variations are possible.

In the above embodiments, the description has been made with reference to the case where the number of reflection elements that form the reflective light guiding system is two or three, but the invention is not limited thereto. The number of reflection elements may be four or greater.

In the above embodiments, the description has been made with reference to the case where the reflection elements that form the reflective light guiding system are reflection mirrors, but the invention is not limited thereto. The reflection elements may be reflection prisms.

In the above embodiments, the description has been made with reference to the case where the curved mirror is a concave mirror, but the invention is not limited thereto. For example, the curved mirror may be a convex mirror or a free-form curved mirror.

In the first to third embodiments, the second lens group includes two lenses, but the invention is not limited thereto. The second lens group may include three or more lenses. In the fourth embodiment, each of the second lens group 682 and the third lens group 684 includes a plurality of lenses, but the invention is not limited thereto. One or both of the lens groups may be comprised of a single lens.

In the first embodiment, the description has been made with reference to the case where each of the reflective type of liquid crystal panels is disposed in such a way that the longitudinal direction of the image formation area extends along the x or y direction, whereas in the second to fourth embodiments, the description has been made with reference to the case where each of the reflective type of liquid crystal panels is disposed in such a way that the longitudinal direction of the image formation area extends along the z direction and the reflective type of liquid crystal panel is rotated from the state in the first embodiment by 90 degrees around the central axis of the image formation area as the axis of rotation. The invention, however, is not limited thereto. Each of the reflective type of liquid crystal panels may be disposed in such a way that the reflective type of liquid crystal panel is rotated from the state in the first embodiment, for example, by 45 degrees around the central axis of the image formation area as the axis of rotation. In this case, the optical components of the projection system are preferably configured in such a way that a projection image projected on the screen is horizontally elongated.

In the above embodiments, a wide-vision reflective type of liquid crystal panel in which the image formation area has an aspect ratio of 16:9 is used as the reflective type of liquid crystal panel, but the invention is not limited thereto. What is called a standard reflective type of liquid crystal panel in which the image formation area has an aspect ratio of 4:3 may be used.

In the above embodiments, a light source including an ellipsoidal reflector is used as the light source, but the invention is not limited thereto. A light source including a parabolic reflector may also be preferably used. In this case, no concave lens is required.

In the above embodiments, the description has been made with reference to the case where a sub-mirror is provided in the arc tube, but the invention is not limited thereto. The sub-mirror may be replaced with a reflection film formed on the outer surface of the lamp body, or the invention is applicable to a projector with no sub-mirror disposed therein.

In the above embodiments, a lens integrator system comprised of a lens array is used as a light homogenizing system, but the invention is not limited thereto. A rod integrator system comprised of rod members can also be preferably used.

In the above embodiments, a plate-type polarizing beam splitter is used as the polarizing beam splitter in the color separation/light guiding system, but the invention is not limited thereto. A prism-type polarizing beam splitter in which two triangular prisms are bonded may be used.

In the above embodiments, the description has been made with reference to the projector using three reflective type of liquid crystal panels, but the invention is not limited thereto. The invention is also applicable to a projector using one reflective type of liquid crystal panel, a projector using two reflective type of liquid crystal panels, and a projector using four or more reflective type of liquid crystal panels.

In the above embodiments, the description has been made with reference to a reflective type projector, but the invention is not limited thereto. The invention is also applicable to a transmissive type projector. The word "reflective" used herein means that the electro-optic modulator as the light modulator is of light-reflecting type, such as a reflective type of liquid crystal panel, and the word "transmissive" used herein means that the electro-optic modulator as the light modulator is of light-transmitting type, such as a transmissive type of liquid crystal panel. When the invention is applied to a transmissive type projector, the same advantageous effects as those provided in a reflective type projector can also be provided.

In the above embodiments, a reflective type of liquid crystal panel is used as the electro-optic modulator, but the invention is not limited thereto. In general, the electro-optic modulator may be any other device that modulates incident light according to image information, such as a micromirror light modulator. For example, a DMD (Digital Micromirror Device: a trademark of Texas Instruments) can be used as the micromirror light modulator.

The invention is applicable not only to a front projection type projector that projects a projection image from the observation side but also to a rear projection type projector that projects a projection image from the side opposite the observation side.

The invention is applicable not only to a projector installed on a desk or other surfaces (desktop type projector) but also to a projector hanging from the ceiling or other surfaces (ceiling-hanging type projector).

What is claimed is:

1. A projection optical system comprising:
a plurality of lens groups including at least a first lens group and a second lens group, and
a curved mirror,
wherein the projection optical system includes a two story structure having a first story located below a second story in a first downward direction, and includes a plurality of plane mirrors that bends at least two times the light incident from a color combining system disposed upstream of the light path of the projection optical system,
the plurality of plane mirrors including
a first plane mirror disposed between the first lens group and the second lens group, the first plane mirror reflecting the light from the first lens group in a second upward direction that is opposite the first downward direction,
a second plane mirror disposed between the first plane mirror and the second lens group in such a way that a normal to a reflection plane of the second plane mirror is perpendicular to a normal to a reflection plane of the first plane mirror, and
a third plane mirror disposed between the second plane mirror and the second lens group, the third plane mirror reflecting the light from the second plane mirror toward the second lens group.

2. The projection optical system according to claim 1, wherein the projection optical system comprises:
the first lens group, first, second and third plane mirrors, second lens group and the curved mirror being arranged in order from upstream to downstream of the light path.

* * * * *